United States Patent [19]

Schläfer et al.

[11] Patent Number: 5,070,189

[45] Date of Patent: Dec. 3, 1991

[54] WATER-SOLUBLE AZO COMPOUNDS CONTAINING A SULFO-NAPHTHOL AS A COUPLING COMPONENT AND HAVING FIBER-REACTIVE GROUPS OF THE VINYLSULFONE SERIES, SUITABLE AS DYESTUFFS

[75] Inventors: Ludwig Schläfer, Kelkheim; Werner H. Russ, Hofheim am Taunus, both of Fed. Rep. of Germany

[73] Assignee: Hoechst Aktiengesellschaft, Frankfurt, Fed. Rep. of Germany

[21] Appl. No.: 397,993

[22] Filed: Aug. 24, 1989

[30] Foreign Application Priority Data

Aug. 25, 1988 [DE] Fed. Rep. of Germany ....... 3828849

[51] Int. Cl.$^5$ ..................... C09B 62/53; D06P 1/384; D06P 3/10; D06P 3/66
[52] U.S. Cl. .................. 534/642; 534/593; 534/641; 534/887
[58] Field of Search ................. 534/641, 642

[56] References Cited

U.S. PATENT DOCUMENTS

| | | | |
|---|---|---|---|
| 3,197,456 | 7/1965 | Kühne et al. | 534/641 |
| 3,267,125 | 8/1966 | Kühne et al. | 534/641 |
| 3,334,961 | 8/1967 | Kühne et al. | 534/641 |
| 3,354,182 | 11/1967 | Kühne et al. | 534/641 X |
| 3,419,541 | 12/1968 | Kühne et al. | 534/641 X |
| 3,442,887 | 5/1969 | Remy | 534/642 X |
| 3,998,805 | 12/1976 | Koller et al. | 534/642 X |
| 4,029,644 | 6/1977 | Meininger et al. | 534/642 |
| 4,045,428 | 8/1977 | Meininger et al. | 534/642 |
| 4,271,072 | 6/1981 | Wenghoefer et al. | 534/642 |
| 4,652,634 | 3/1987 | Mischke et al. | 534/641 X |

FOREIGN PATENT DOCUMENTS

| | | | |
|---|---|---|---|
| 1083584 | 1/1955 | France | 534/642 |
| 472485 | 10/1963 | Switzerland | 534/641 |
| 471877 | 8/1965 | Switzerland | 534/641 |
| 894788 | 4/1962 | United Kingdom | 534/641 |

*Primary Examiner*—Mary C. Lee
*Assistant Examiner*—Fiona T. Powers

[57] ABSTRACT

Water-soluble azo compounds which have fiber-reactive dyestuff properties and dye materials containing carboxamide and/or hydroxyl groups, such as fiber materials, in particular cellulose fiber materials, in strong, fast, predominantly bluish-tinged red to orange shades; they correspond to the general formula (1)

$$X-SO_2-(CH_2)_n-D-N=N-\overset{OH}{\underset{MO_3S\ \ \ (SO_3M)_m}{\bigcirc\!\!\bigcirc}}\overset{R}{\underset{}{N-SO_2-Y}} \quad (1)$$

in which:
M is a hydrogen atom or an alkali metal;
R is alkyl having 1 to 4 carbon atoms;
D is a group of the formula

[structures shown]

in which
$R^1$ is hydrogen, alkyl having 1 to 4 carbon atoms, hydroxy, nitro, alkoxy having 1 to 4 carbon atoms, chlorine, bromine or carboxy, $R^2$ is hydrogen, alkyl having 1 to 4 carbon atoms, alkoxy having 1 to 4 carbon atoms, chlorine or sulfo,
$R^3$ is hydrogen or sulfo;
k is the number zero or 1;
p is the number zero, 1 or 2;
m is the number zero or 1;
n is the number zero or 1; and
X and Y are both independently of one another vinyl, β-thiosulfatoethyl or β-sulfatoethyl.

19 Claims, No Drawings

WATER-SOLUBLE AZO COMPOUNDS CONTAINING A SULFO-NAPHTHOL AS A COUPLING COMPONENT AND HAVING FIBER-REACTIVE GROUPS OF THE VINYLSULFONE SERIES, SUITABLE AS DYESTUFFS

DESCRIPTION

The invention relates to the technical field of fiber-reactive azo dyestuffs.

Fiber-reactive azo dyestuffs which have a β-sulfatoethylsulfonamido or an N-alkyl-(β-sulfatoethyl)-sulfonamido group are known from U.S. Pat. Nos. 3,197,456, 3,267,125 and 3,334,961. However, these known dyestuffs have technological deficiencies; when used by the short-time pad batch processes customary for fiber-reactive dyestuffs and in particular when used by the exhaustion process they have fixing properties and a build-up capacity which are too low on cellulose fiber materials and accordingly produce dyeings of too low a depth of color on cellulose fiber materials. Their industrial usefulness lies merely in use as dyestuffs in textile printing and in pad processes in which fixing of the dyestuffs to the fiber is carried out above 60° C.

Novel fiber-reactive azo compounds which, surprisingly, dye cellulose fiber materials with a good depth of color, while having a high fixing yield and good color build-up, even when used by the short-time pad batch processes and in the customary exhaustion processes, have now been found with the present invention.

The novel azo compounds according to the invention correspond to the general formula (1)

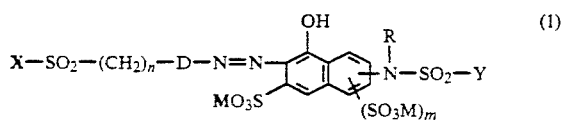

in which:

M is a hydrogen atom or an alkali metal, such as sodium, potassium or lithium;

R is alkyl having 1 to 4 carbon atoms, such as ethyl and in particular methyl;

D is a group corresponding to the general formula (2a), (2b) or (2c)

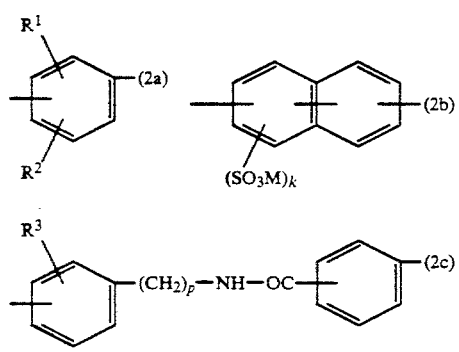

in which $R^1$ is alkyl having 1 to 4 carbon atoms, such as ethyl or in particular methyl, hydroxy or nitro, or preferably hydrogen, alkoxy having 1 to 4 carbon atoms, such as ethoxy or in particular methoxy, chlorine, bromine or carboxy, $R^2$ is hydrogen, alkyl having 1 to 4 carbon atoms, such as ethyl or in particular methyl, alkoxy having 1 to 4 carbon atoms, such as ethoxy or in particular methoxy, chlorine or sulfo, $R^3$ is hydrogen or sulfo, k represents the number zero or 1 (and in the case where k is zero, this group denotes a hydrogen atom), p represents the number zero, 1 or 2 and M has the abovementioned meaning;

m is the number zero or 1, preferably zero (and in the case where m is zero, this group denotes a hydrogen atom);

n is the number zero or 1, preferably zero;

X is vinyl or β-thiosulfatoethyl or β-sulfatoethyl, preferably vinyl and in particular β-sulfatoethyl; and Y is vinyl or β-thiosulfatoethyl or β-sulfatoethyl, preferably vinyl and in particular β-sulfatoethyl;

and the individual formula members can have meanings which are identical to one another or different from one another.

The substituents "sulfo", "carboxy,", "thiosulfato" and "sulfato" include both the acid form thereof and the salt form thereof. Accordingly, sulfo groups denote groups corresponding to the general formula $-SO_3M$, carboxy groups denote groups corresponding to the general formula $-COOM$, thiosulfato groups denote groups corresponding to the general formula $-S-SO_3M$ and sulfato groups denote groups corresponding to the general formula $-OSO_3M$, in which M has the abovementioned meaning.

The novel azo compounds can be either in acid form or in the form of their salts. They are preferably in the form of the salts and are also preferably used in the form of these salts for dyeing (understood here and below in the general sense and including printing) materials containing hydroxy and/or carboxamide groups, in particular fiber materials. They can be used particularly well by all the dyeing and printing processes such as are described in abundance for fiber-reactive dyestuffs and produce deep dyeings and prints with high color yields, a good color build-up and good fastness properties, of which the wet-fastness properties can be singled out in particular.

Particularly preferred azo compounds corresponding to the general formula (1) are those in which D denotes a radical of the general formula (2a) or (2b), and of these in particular those in which X and Y both represent the β-sulfatoethyl group and m and n both denote the number zero.

The present invention furthermore relates to processes for the preparation of the novel compounds of the general formula (1). They can be prepared according to the invention by coupling a diazonium salt of an aromatic amino compound corresponding to the general formula (3)

in which X, n and D have the abovementioned meanings, to a compound corresponding to the general formula (4)

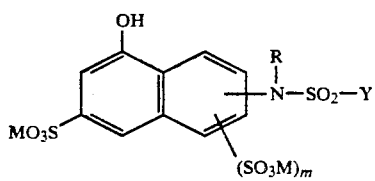

in which M, m, R and Y have the abovementioned meanings, or by reacting a compound corresponding to the general formula (5)

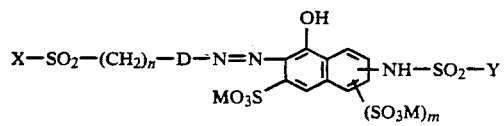

in which X, Y, n, D, M and m have the abovementioned meanings, with an alkylating agent.

The amino compound of the general formula (3) is converted into its diazonium salt in the manner known for diazotization of aromatic amino compounds, thus, for example, in aqueous medium by means of nitrous acid at a temperature between $-5°$ C. and $+10°$ C. and a pH of less than 2.5. The coupling reaction according to the invention of the diazonium salt with the compound (4) is likewise carried out by procedures analogous to those known for the reaction of diazonium compounds with coupling components to give azo compounds, such as, for example, in an aqueous medium at a pH between 3 and 8, preferably between 4 and 7, and a temperature between 5° and 35° C., preferably between 10° and 25° C.

The alkylation reaction of the starting compounds of the general formula (5), which can be prepared by procedures analogous to known procedures by coupling of the diazonium salt of a compound of the general formula (3) with a compound corresponding to the general formula (4) but in which R represents a hydrogen atom, is also carried out by procedures analogous to those known for alkylation of amino compounds, such as, for example, in an aqueous medium or aqueous-organic medium, with the aid of a customary alkylating agent, such as an alkyl iodide having 1 to 4 carbon atoms, in particular methyl iodide, or a dialkyl sulfate with alkyl radicals having 1 to 4 carbon atoms, such as dimethyl sulfate, at a temperature between 30° C. and 130° C. and a pH between 6 and 8, preferably between 7 and 7.5. Such procedures are known, for example, from German Patent Specification No. 1,262,475.

The starting compounds of the general formula (3) are described in abundance in the literature. Examples of compounds of the general formula (3) are: 4-($\beta$-sulfatoethylsulfonyl)-aniline, 4-($\beta$-thiosulfatoethylsulfonyl)-aniline, 4-vinylsulfonyl-aniline, 4-($\beta$-sulfatoethylsulfonyl-methyl)-aniline, 3-($\beta$-sulfatoethylsulfonyl-methyl)-aniline, 3-($\beta$-sulfatoethylsulfonyl)-aniline, 2-methoxy-4-($\beta$-sulfatoethylsulfonyl)-aniline, 2-methoxy-5-($\beta$-sulfatoethylsulfonyl)-aniline, 2,5-dimethoxy-4-($\beta$-sulfatoethylsulfonyl)-aniline, 2-methoxy-5-methyl-4-($\beta$-sulfatoethylsulfonyl)-aniline, 2-bromo-4-($\beta$-sulfatoethylsulfonyl)-aniline, 2-sulfo-4-($\beta$-sulfatoethylsulfonyl)-aniline, 2-sulfo-5-($\beta$-sulfatoethylsulfonyl)-aniline, 2,5-dichloro-4-($\beta$-sulfatoethylsulfonyl)-aniline, 4-($\beta$-sulfatoethylsulfonyl)-1-aminonaphthalene, 5-($\beta$-sulfatoethylsulfonyl)-2-aminonaphthalene, 6-($\beta$-sulfatoethylsulfonyl)-2-aminonaphthalene, 7-($\beta$-sulfatoethylsulfonyl)-2-aminonaphthalene, 8-($\beta$-sulfatoethylsulfonyl)-2-aminonaphthalene, 5-($\beta$-sulfatoethylsulfonyl)-1-sulfo-2-aminonaphthalene, 6-($\beta$-sulfatoethylsulfonyl)-1-sulfo-2-aminonaphthalene, 6-($\beta$-sulfatoethylsulfonyl)-8-sulfo-2-aminonaphthalene, 8-($\beta$-sulfatoethylsulfonyl)-6-sulfo-2-aminonaphthalene, 3'-($\beta$-sulfatoethylsulfonyl)-4-aminobenzanilide, 4-amino-N'-$\beta$-[4'-($\beta'$-sulfatoethylsulfonyl)-phenyl]-ethyl-benzanilide and 4-amino-N'-$\beta$-[2'-sulfo-4'-($\beta'$-sulfatoethylsulfonyl)-phenyl]-ethyl-benzanilide.

The starting compounds corresponding to the general formula (4) in which R represents a hydrogen atom or an alkyl group are likewise described in the literature, for example in the abovementioned U.S. Patents, or they can be prepared by instructions analogous to those given therein. Examples of starting compounds corresponding to the general formula (4) are: 2-[N-methyl-N-($\beta$-sulfatoethylsulfonyl)]-amino-6-sulfo-8-naphthol, 3-[N-methyl-N-($\beta$-sulfatoethylsulfonyl)]-amino-6-sulfo-8-naphthol, 2-[N-ethyl-N-($\beta$-sulfatoethylsulfonyl)]-amino-6-sulfo-8-naphthol, 2-[N-methyl-N-($\beta$-sulfatoethylsulfonyl)]-amino-3,6-disulfo-8-naphthol and 3-[N-methyl-N-($\beta$-sulfatoethylsulfonyl)]-amino-4,6-disulfo-8-naphthol.

The compounds of the general formula (1) prepared according to the invention can be precipitated and isolated from the synthesis solutions by generally known methods, such as, for example, either by precipitation from the reaction medium by means of electrolytes, such as, for example, sodium chloride or potassium chloride, or by evaporation of the reaction solution, for example by spray drying, it being possible for a buffer substance to be added to this reaction solution.

The compounds of the general formula (1) according to the invention—called compounds (1) below—have fiber-reactive properties and have useful dyestuff properties. They can therefore be used for dyeing (including printing) naturally occurring, regenerated or synthetic materials containing hydroxy groups and/or containing carboxamide groups, for example in the form of sheet-like structures, such as paper and leather, or polyamide or polyurethane, but in particular such materials in fiber form, such as cellulose fiber materials, silk, wool and synthetic polyamide and polyurethane fibers. The solutions obtained in the synthesis of the compounds (1) can also be put to use directly for dyeing as a liquid preparation, if appropriate after addition of a buffer substance and if appropriate also after concentration.

Depending on the use according to the invention, the compounds (1) can be applied to and fixed on the substrates mentioned, in particular on the fiber materials mentioned, by the use techniques known for water-soluble, in particular fiber-reactive, dyestuffs, such as, for example, by applying the compound (1) in dissolved form to the substrate or incorporating it therein and fixing it on this or in this, by the action of heat and/or by the action of an alkaline agent. Such dyeing and fixing procedures are described in abundance in the literature, for example in German Offenlegungsschrift No. 3,025,572.

The present invention therefore also relates to the use of the compounds (1) for dyeing (including printing) materials containing hydroxy and/or carboxamide groups and to processes for their use on these substrates. The materials are preferably used in the form of fiber materials, in particular in the form of textile fibers, such as yarns, wound packages and woven fabrics. The procedure followed here can be analogous to known procedures of application and fixing of fiber-reactive dyestuffs.

The monoazo compounds (1) according to the invention are distinguished by a good water-solubility and a good color build-up. Their degree of fixing is very high, which is why the non-fixed portion is only low, so that only little of the compound (1) used enters the effluent with the rinsing or washing water during finishing of the dyeings and prints. Non-fixed portions can easily be washed out. Their good stability in printing pastes, padding liquors and dyebaths is furthermore worth mentioning. Their dyeings and prints have, in particular on cellulose fiber materials, good use and fabrication properties, such as, for example, good light-fastnesses on dry dyed material and on damp dyed material, such as, for example, material impregnated with drinking water or a perspiration solution, and good fastness to washing, chlorinated water, exhaust gas, ironing, pleating, decatizing, dry-cleaning, rubbing, acid, alkali and cross-dyeing, good fastness to alkaline and acid perspiration and a high stability to acid storage. In the exhaustion process, the color yield scarcely depends on the temperature, so that virtually uniformly deep dyeings are obtained with the compounds (1) according to the invention, for example on cellulose fiber materials, such as cotton, at dyeing temperatures of 40° C., 60° C. and 80° C. This means a high dyeing reliability, which is of considerable practical importance. The prints are obtained with sharp contours and a clear white background; dyeings and prints do not stain adjacent material.

The following Examples serve to illustrate the invention. The parts are parts by weight and the percentage data represent percentages by weight, unless indicated otherwise. Parts by weight bear the same relation to parts by volume as the kilogram to the liter.

The compounds described by way of their formulae in these Examples are shown in the form of the free acids; they are in general prepared and isolated in the form of their sodium or potassium salts and used for dyeing in the form of their salts. The starting compounds and components mentioned in the form of the free acid in the following Examples, in particular the Tabular Examples, can likewise be used as such or in the form of their salts, preferably alkali metal salts, such as sodium or potassium salts, in the synthesis. The absorption maxima quoted in the visible range ($\lambda_{max}$ values) were determined from an aqueous solution of the alkali metal salts.

EXAMPLE 1 a) 25.3 parts of 2-methylamino-8-naphthol-6-sulfonic acid are dissolved in 70 parts of water with 8 parts by volume of concentrated aqueous sodium hydroxide solution. 1.5 parts of 39% strength aqueous sodium sulfite solution are added, followed by 2.4 parts by volume of concentrated aqueous sodium hydroxide solution, 53 parts of sodium bicarbonate and 85 parts of ice and then 60 parts of carbyl sulfate, and stirring of the mixture is continued at a temperature between −10° C. and −5° C. for a further 30 to 60 minutes.

b) A hydrochloric acid suspension, prepared in the customary manner, of the diazonium salt of 28.1 parts of 4-(β-sulfatoethylsulfonyl)-aniline in about 150 parts of water is added to the coupling component solution prepared under a) and the coupling reaction is carried out at a pH between 4 and 7 and a temperature between 20° and 30° C.

The resulting solution of the azo compound according to the invention is salted out with potassium chloride or sodium chloride in an amount of 20%, based on the solution volume, at a pH between 4 and 5 and the product is filtered off, washed with an aqueous solution containing potassium chloride or sodium chloride and dried under reduced pressure at 80° to 100° C.—The compound according to the invention can also be isolated from the solution by spray-drying after the solution has first been clarified, for example by means of active charcoal.

The alkali metal salt, according to the invention, of the compound of the formula

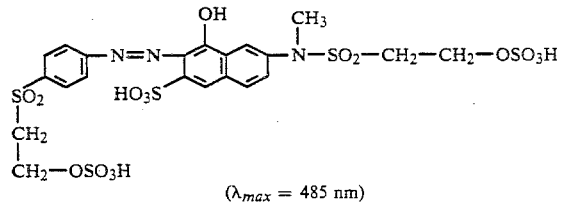

($\lambda_{max}$ = 485 nm)

is obtained in the form of a powder containing electrolytes (in particular containing sodium chloride or potassium chloride). This monoazo compound according to the invention has very good fiber-reactive dyestuff properties and produces deep orange dyeings and prints with good fastness properties, such as, for example, good fastnesses during washing at 60° C. and 95° C. and good fastness to chlorine and perspiration, on the materials mentioned in the description, such as, in particular, cellulose fiber materials, by the dyeing and printing processes customary for fiber-reactive dyestuffs, such as, for example, by the known 1- and 2-phase printing processes, the pad batch processes or other pad processes with fixing temperatures above 40° C. and the exhaustion processes. The good light-fastnesses of the dyeings and prints both in the dry state and in the damp state caused by drinking water or an alkaline perspiration solution are likewise to be singled out. The azo compound according to the invention exhibits a good color build-up in these processes; the prints have a clear white background. Non-fixed portions of the azo compound according to the invention can easily be washed out of the materials. The degrees of fixing are high and are, for example, about 70% in the exhaustion process at 60° C. The dyeings are obtained with the same shade and depth of color at dyeing temperatures of 40° C., 60° C. and 80° C.

EXAMPLE 2

100 parts of ice and 60 parts of sodium bicarbonate are added to a neutral solution of 22.9 parts of 3-amino-8-naphthol-6-sulfonic acid in 100 parts of water, and 65 parts of carbyl sulfate are then added. The reaction is carried out at a temperature between −10° C. and 0° C. under a nitrogen atmosphere. When the reaction is at least 95% complete, an acid aqueous diazonium salt solution, prepared in the customary manner, of 34.1 parts of 2,5-dimethoxy-4-(β-sulfatoethylsulfonyl)-aniline in about 150 parts of water is added and the coupling reaction is carried out at a pH of 4 and a temperature between 15 and 25° C. The azo compound thus prepared is isolated by salting out with sodium chloride and filtration and is then suspended again in 600 parts of water at 40° C. and dissolved at a pH of 7 by addition of sodium carbonate. 108 parts by volume of dimethyl sulfate are introduced into this solution in the course of one hour, with thorough stirring, the pH being kept constant at 7 by means of aqueous 2N sodium carbonate solution. The mixture is subsequently stirred at 40° C. for a further 2 hours and cooled to about 10° C. and the azo compound according to the invention is precipitated by means of potassium chloride.

After filtration, washing with an aqueous solution containing potassium chloride and drying under reduced pressure, a dark red powder, containing electrolyte salt, of the potassium salt of the compound of the formula ethylation reaction is carried out at a pH of 7 and a temperature of 40° to 45° C. for 2 hours.

An acid aqueous solution, prepared in the customary manner, of the diazonium salt of 41.1 parts of 8-($\beta$-sulfatoethylsulfonyl)-2-aminonaphthalene-6-sulfonic acid is added to the resulting solution of the coupling component and the coupling reaction is carried out at a temperature between 10° and 20° C. and a pH of 4 to 5. The azo compound according to the invention is isolated from its synthesis solution by salting out with potassium chloride.

After filtration, washing with an aqueous solution containing potassium chloride and drying under reduced pressure, a dark red powder, containing electrolyte salt, of the potassium salt of the compound of the formula

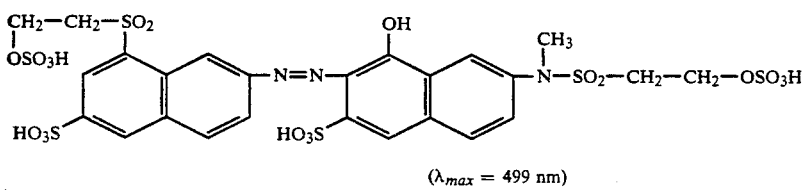

($\lambda_{max}$ = 499 nm)

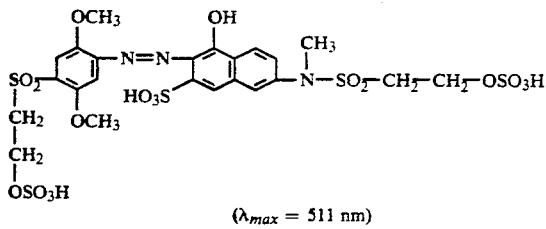

($\lambda_{max}$ = 511 nm)

which has very good fiber-reactive dyestuff properties is obtained. For example, on cellulose fiber materials by the application and fixing methods customary for these, it produces deep red dyeings and prints with good fastness properties, such as, for example, the good fastnesses described for the azo compound according to the invention in Example 1. The degree of fixing and the color build-up are very high and the prints are obtained with a clear white background.

EXAMPLE 3

22.9 parts of 2-amino-8-naphthol-6-sulfonic acid are reacted in aqueous solution by means of 65 parts of carbyl sulfate analogously to the instructions of Example 2. 230 parts of diethyl sulfate are then added and the which has very good fiber-reactive dyestuff properties, is obtained. For example, on cellulose fiber materials by the application and fixing methods customary for this, it produces deep reddish-tinged orange dyeings and prints with good fastness properties, such as, for example, the good fastnesses described for the azo compound according to the invention in Example 1. The degree of fixing and the color build-up are very high, and the prints are obtained with a clear white background.

EXAMPLES 4 TO 70

Further monoazo compounds according to the invention are described with the aid of the components corresponding to the general formula (1) in the following Tabular Examples. They can be prepared in the manner according to the invention, for example by one of the above Embodiment Examples, by means of the components which can be seen from the particular Tabular Example. They have fiber-reactive dyestuff properties and produce, in particular on cellulose fiber materials by the application and fixing methods customary for fiber-reactive dyestuffs, deep fast dyeings and prints in the color shades stated for dyeings on cotton in the particular Tabular Example.

| Example | Radical X—SO$_2$—(CH$_2$)$_n$-D- | Component corresponding to formula (4) | Color shade ($\lambda_{max}$ = ... nm) |
|---|---|---|---|
| 4 | 4-($\beta$-Sulfatoethylsulfonyl)-phenyl | 2-[N-Ethyl-N-($\beta$-sulfatoethylsulfonyl)]-amino-6-sulfo-8-naphthol | reddish-tinged orange (486) |
| 5 | " | 3-[N-Ethyl-N-($\beta$-sulfatoethylsulfonyl)]-amino-6-sulfo-8-naphthol | orange (479) |
| 6 | " | 2-[N-Methyl-N-($\beta$-sulfatoethylsulfonyl)]-amino-6-sulfo-8-naphthol | orange (480) |
| 7 | " | 3-[N-Methyl-N-($\beta$-sulfatoethylsulfonyl)]-amino-4,6-disulfo-8-naphthol | orange |
| 8 | " | 2-[N-Methyl-N-($\beta$-sulfatoethylsulfonyl)]-amino-3,6-disulfo-8-naphthol | red |
| 9 | 4-Vinylsulfonyl-phenyl | 2-[N-Methyl-N-($\beta$-sulfatoethylsulfonyl)]-amino-3,6-disulfo-8-naphthol | red |
| 10 | " | 2-[N-Ethyl-N-($\beta$-sulfatoethylsulfonyl)]-amino-6-sulfo-8-naphthol | reddish-tinged orange (485) |
| 11 | " | 2-[N-Methyl-N-($\beta$-sulfatoethylsulfonyl)]-amino-6-sulfo-8-naphthol | reddish-tinged orange (484) |
| 12 | " | 3-[N-Methyl-N-($\beta$-sulfatoethylsulfonyl)]-amino-6-sulfo-8-naphthol | orange (480) |

-continued

| Example | Radical X—SO$_2$—(CH$_2$)$_n$-D- | Component corresponding to formula (4) | Color shade ($\lambda_{max}$ = ... nm) |
|---|---|---|---|
| 13 | 3-Vinylsulfonyl-phenyl | 3-[N-Methyl-N-(β-sulfatoethylsulfonyl)]-amino-6-sulfo-8-naphthol | orange (478) |
| 14 | " | 2-[N-Methyl-N-(β-sulfatoethylsulfonyl)]-amino-6-sulfo-8-naphthol | reddish-tinged orange |
| 15 | 3-(β-Thiosulfatoethyl-sulfonyl)-phenyl | 2-[N-Methyl-N-(β-sulfatoethylsulfonyl)]-amino-6-sulfo-8-naphthol | reddish-tinged orange (482) |
| 16 | 3-(β-Thiosulfatoethyl-sulfonyl)-phenyl | 3-[N-Methyl-N-(β-sulfatoethylsulfonyl)]-amino-6-sulfo-8-naphthol | orange (479) |
| 17 | 4-(β-Thiosulfatoethyl-sulfonyl)-phenyl | 3-[N-Methyl-N-(β-sulfatoethylsulfonyl)]-amino-6-sulfo-8-naphthol | orange (477) |
| 18 | 4-(β-Thiosulfatoethyl-sulfonyl)-phenyl | 2-[N-Methyl-N-(β-sulfatoethylsulfonyl)]-amino-6-sulfo-8-naphthol | reddish-tinged orange (485) |
| 19 | 4-(β-Sulfatoethylsulfo-nyl-methyl)-phenyl | 2-[N-Methyl-N-(β-sulfatoethylsulfonyl)]-amino-6-sulfo-8-naphthol | reddish-tinged orange (487) |
| 20 | 4-(β-Sulfatoethylsulfo-nyl-methyl)-phenyl | 3-[N-Methyl-N-(β-sulfatoethylsulfonyl)]-amino-6-sulfo-8-naphthol | orange (481) |
| 21 | 3-(β-Sulfatoethylsulfonyl-methyl)-phenyl | 3-[N-Methyl-N-(β-sulfatoethylsulfonyl)]-amino-6-sulfo-8-naphthol | orange |
| 22 | 3-(β-Sulfatoethylsulfonyl-methyl)-phenyl | 2-[N-Methyl-N-(β-sulfatoethylsulfonyl)]-amino-6-sulfo-8-naphthol | reddish-tinged orange |
| 23 | 2-Methoxy-4-(β-sulfato-ethylsulfonyl)-phenyl | 2-[N-Methyl-N-(β-sulfatoethylsulfonyl)]-amino-6-sulfo-8-naphthol | red |
| 24 | 2-Methoxy-4-(β-sulfato-ethylsulfonyl)-phenyl | 3-[N-Methyl-N-(β-sulfatoethylsulfonyl)]-amino-6-sulfo-8-naphthol | scarlet |
| 25 | 2-Methoxy-5-(β-sulfato-ethylsulfonyl)-phenyl | 3-[N-Methyl-N-(β-sulfatoethylsulfonyl)]-amino-6-sulfo-8-naphthol | reddish-tinged orange |
| 26 | 2-Methoxy-5-(β-sulfato-ethylsulfonyl)-phenyl | 2-[N-Methyl-N-(β-sulfatoethylsulfonyl)]-amino-6-sulfo-8-naphthol | red |
| 27 | 2,5-Dimethoxy-4-(β-sulfato-ethylsulfonyl)-phenyl | 2-[N-Methyl-N-(β-sulfatoethylsulfonyl)]-amino-6-sulfo-8-naphthol | bluish-tinged red (510) |
| 28 | 2,5-Dimethoxy-4-(β-sulfato-ethylsulfonyl)-phenyl | 3-[N-Methyl-N-(β-sulfatoethylsulfonyl)]-amino-6-sulfo-8-naphthol | red (505) |
| 29 | 2-Methoxy-5-methyl-4-(β-sulfatoethylsulfonyl)-phenyl | 3-[N-Methyl-N-(β-sulfatoethylsulfonyl)]-amino-6-sulfo-8-naphthol | yellowish-tinged red (498) |
| 30 | 2-Methoxy-5-methyl-4-(β-sulfatoethylsulfonyl)-phenyl | 2-[N-Methyl-N-(β-sulfatoethylsulfonyl)]-amino-6-sulfo-8-naphthol | red (506) |
| 31 | 2-Brom-4-(β-sulfatoethyl-sulfonyl)-phenyl | 2-[N-Methyl-N-(β-sulfatoethylsulfonyl)]-amino-6-sulfo-8-naphthol | reddish-tinged orange (479) |
| 32 | 2-Brom-4-(β-sulfatoethyl-sulfonyl)-phenyl | 3-[N-Methyl-N-(β-sulfatoethylsulfonyl)]-amino-6-sulfo-8-naphthol | orange |
| 33 | 2-Sulfo-4-(β-sulfatoethyl-sulfonyl)-phenyl | 3-[N-Methyl-N-(β-sulfatoethylsulfonyl)]-amino-6-sulfo-8-naphthol | orange |
| 34 | 2-Sulfo-4-(β-sulfatoethyl-sulfonyl)-phenyl | 2-[N-Methyl-N-(β-sulfatoethylsulfonyl)]-amino-6-sulfo-8-naphthol | reddish-tinged orange (447) |
| 35 | 2-Sulfo-5-(β-sulfatoethyl-sulfonyl)-phenyl | 2-[N-Methyl-N-(β-sulfatoethylsulfonyl)]-amino-6-sulfo-8-naphthol | reddish-tinged orange |
| 36 | 2-Sulfo-5-(β-sulfatoethyl-sulfonyl)-phenyl | 3-[N-Methyl-N-(β-sulfatoethylsulfonyl)]-amino-6-sulfo-8-naphthol | orange |
| 37 | 4-(β-Sulfatoethylsulfonyl)-naphth-1-yl | 3-[N-Methyl-N-(β-sulfatoethylsulfonyl)]-amino-6-sulfo-8-naphthol | scarlet |
| 38 | 4-(β-Sulfatoethylsulfonyl)-naphth-1-yl | 2-[N-Methyl-N-(β-sulfatoethylsulfonyl)]-amino-6-sulfo-8-naphthol | red |
| 39 | 5-(β-Sulfatoethylsulfonyl)-naphth-2-yl | 2-[N-Methyl-N-(β-sulfatoethylsulfonyl)]-amino-6-sulfo-8-naphthol | red |
| 40 | 5-(β-Sulfatoethylsulfonyl)-naphth-2-yl | 3-[N-Methyl-N-(β-sulfatoethylsulfonyl)]-amino-6-sulfo-8-naphthol | reddish-tinged orange |
| 41 | 5-(β-Sulfatoethylsulfonyl)-1-sulfo-naphth-2-yl | 3-[N-Methyl-N-(β-sulfatoethylsulfonyl)]-amino-6-sulfo-8-naphthol | orange |
| 42 | 5-(β-Sulfatoethylsulfonyl)-1-sulfo-naphth-2-yl | 2-[N-Methyl-N-(β-sulfatoethylsulfonyl)]-amino-6-sulfo-8-naphthol | reddish-tinged orange |
| 43 | 6-(β-Sulfatoethylsulfonyl)-1-sulfo-naphth-2-yl | 2-[N-Methyl-N-(β-sulfatoethylsulfonyl)]-amino-6-sulfo-8-naphthol | reddish-tinged orange (491) |
| 44 | 6-(β-Sulfatoethylsulfonyl)-1-sulfo-naphth-2-yl | 3-[N-Methyl-N-(β-sulfatoethylsulfonyl)]-amino-6-sulfo-8-naphthol | orange (486) |
| 45 | 6-(β-Sulfatoethylsulfonyl)-8-sulfo-naphth-2-yl | 3-[N-Methyl-N-(β-sulfatoethylsulfonyl)]-amino-6-sulfo-8-naphthol | orange (492) |
| 46 | 6-(β-Sulfatoethylsulfonyl)-8-sulfo-naphth-2-yl | 2-[N-Methyl-N-(β-sulfatoethylsulfonyl)]-amino-6-sulfo-8-naphthol | red (497) |
| 47 | 8-(β-Sulfatoethylsulfonyl)-6-sulfo-naphth-2-yl | 2-[N-Methyl-N-(β-sulfatoethylsulfonyl)]-amino-6-sulfo-8-naphthol | red (499) |
| 48 | 8-(β-Sulfatoethylsulfonyl)-6-sulfo-naphth-2-yl | 3-[N-Methyl-N-(β-sulfatoethylsulfonyl)]-amino-6-sulfo-8-naphthol | reddish-tinged orange |
| 49 | 6-(β-Sulfatoethylsulfonyl)-naphth-2-yl | 3-[N-Methyl-N-(β-sulfatoethylsulfonyl)]-amino-6-sulfo-8-naphthol | reddish-tinged orange |
| 50 | 6-(β-Sulfatoethylsulfonyl)-naphth-2-yl | 2-[N-Methyl-N-(β-sulfatoethylsulfonyl)]-amino-6-sulfo-8-naphthol | red |
| 51 | 8-(β-Sulfatoethylsulfonyl)-naphth-2-yl | 2-[N-Methyl-N-(β-sulfatoethylsulfonyl)]-amino-6-sulfo-8-naphthol | red |
| 52 | 8-(β-Sulfatoethylsulfonyl)-naphth-2-yl | 3-[N-Methyl-N-(β-sulfatoethylsulfonyl)]-amino-6-sulfo-8-naphthol | reddish-tinged orange |

| Example | Radical X—SO₂—(CH₂)ₙ-D- | Component corresponding to formula (4) | Color shade ($\lambda_{max}$ = ... nm) |
|---|---|---|---|
| 53 | 5-Vinylsulfonyl-1-sulfo-naphth-2-yl | 3-[N-Methyl-N-(β-sulfatoethylsulfonyl)]-amino-6-sulfo-8-naphthol | reddish-tinged orange |
| 54 | 5-Vinylsulfonyl-1-sulfo-naphth-2-yl | 2-[N-Methyl-N-(β-sulfatoethylsulfonyl)]-amino-6-sulfo-8-naphthol | red |
| 55 | 6-Vinylsulfonyl-1-sulfo-naphth-2-yl | 2-[N-Methyl-N-(β-sulfatoethylsulfonyl)]-amino-6-sulfo-8-naphthol | red (498) |
| 56 | 6-Vinylsulfonyl-1-sulfo-naphth-2-yl | 3-[N-Methyl-N-(β-sulfatoethylsulfonyl)]-amino-6-sulfo-8-naphthol | reddish-tinged orange (485) |
| 57 | 6-Vinylsulfonyl-8-sulfo-naphth-2-yl | 3-[N-Methyl-N-(β-sulfatoethylsulfonyl)]-amino-6-sulfo-8-naphthol | reddish-tinged orange (493) |
| 58 | 6-Vinylsulfonyl-8-sulfo-naphth-2-yl | 2-[N-Methyl-N-(β-sulfatoethylsulfonyl)]-amino-6-sulfo-8-naphthol | red (497) |
| 59 | 8-Vinylsulfonyl-6-sulfo-naphth-2-yl | 2-[N-Methyl-N-(β-sulfatoethylsulfonyl)]-amino-6-sulfo-8-naphthol | red (498) |
| 60 | 8-Vinylsulfonyl-6-sulfo-naphth-2-yl | 3-[N-Methyl-N-(β-sulfatoethylsulfonyl)]-amino-6-sulfo-8-naphthol | reddish-tinged orange |
| 61 | 4-Vinylsulfonyl-2-sulfo-phenyl | 3-[N-Methyl-N-(β-sulfatoethylsulfonyl)]-amino-6-sulfo-8-naphthol | reddish-tinged orange |
| 62 | 4-Vinylsulfonyl-2-sulfo-phenyl | 2-[N-Methyl-N-(β-sulfatoethylsulfonyl)]-amino-6-sulfo-8-naphthol | red |
| 63 | 5-Vinylsulfonyl-2-sulfo-phenyl | 2-[N-Methyl-N-(β-sulfatoethylsulfonyl)]-amino-6-sulfo-8-naphthol | red |
| 64 | 5-Vinylsulfonyl-2-sulfo-phenyl | 3-[N-Methyl-N-(β-sulfatoethylsulfonyl)]-amino-6-sulfo-8-naphthol | reddish-tinged orange |
| 65 | 4-[3'-(β-Sulfatoethylsulfonyl)-phenyl-amidocarbonyl]-phenyl | 3-[N-Methyl-N-(β-sulfatoethylsulfonyl)]-amino-6-sulfo-8-naphthol | reddish-tinged orange |
| 66 | 4-[3'-(β-Sulfatoethylsulfonyl)-phenyl-amidocarbonyl]-phenyl | 2-[N-Methyl-N-(β-sulfatoethylsulfonyl)]-amino-6-sulfo-8-naphthol | red |
| 67 | 4-{N-[β-(4'-β'-Sulfatoethylsulfonyl-phenyl)-ethyl]-amidocarbonyl}-phenyl | 2-[N-Methyl-N-(β-sulfatoethylsulfonyl)]-amino-6-sulfo-8-naphthol | red |
| 68 | 4-{N-[β-(4'-β'-Sulfatoethylsulfonyl-phenyl)-ethyl]-amidocarbonyl}-phenyl | 3-[N-Methyl-N-(β-sulfatoethylsulfonyl)]-amino-6-sulfo-8-naphthol | reddish-tinged orange |
| 69 | 4-{N-[β-(2'-Sulfo-4'-β'-sulfatoethylsulfonyl-phenyl)-ethyl]-amidocarbonyl}-phenyl | 3-[N-Methyl-N-(β-sulfatoethylsulfonyl)]-amino-6-sulfo-8-naphthol | reddish-tinged orange |
| 70 | 4-{N-[β-(2'-Sulfo-4'-β'-sulfatoethylsulfonyl-phenyl)-ethyl]-amidocarbonyl}-phenyl | 2-[N-Methyl-N-(β-sulfatoethylsulfonyl)]-amino-6-sulfo-8-naphthol | red |

We claim:

1. A water-soluble azo compound corresponding to the formula (1)

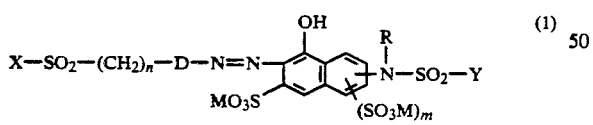

in which:
  M is hydrogen or an alkali metal;
  R is alkyl having 1 to 4 carbons;
  D is a group corresponding to the formula (2a), (2b) or (2c)

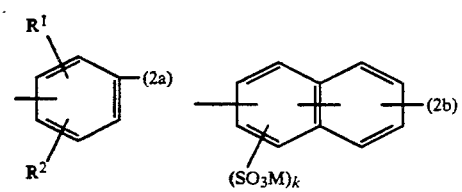

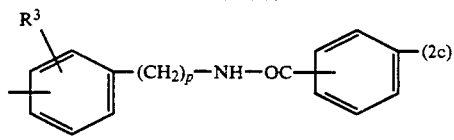

in which
  R¹ is hydrogen, alkyl having 1 to 4 carbons, hydroxy, nitro, alkoxy having 1 to 4 carbons, chlorine, bromine or carboxy,
  R² is hydrogen, alkyl having 1 to 4 carbons, alkoxy having 1 to 4 carbons, chlorine or sulfo,
  R³ is hydrogen or sulfo,
  k represents the number zero or 1 (and in the case where k is zero, this group denotes hydrogen),
  p represents the number zero, 1 or 2 and
  M has the abovementioned meaning;
  m is the number zero or 1 (and in the case where m is zero, this group denotes hydrogen);
  n is the number zero or 1;
  X is vinyl or β-thiosulfatoethyl or β-sulfatoethyl;
  Y is vinyl or β-thiosulfatoethyl or β-sulfatoethyl;
  and the individual formula members can have meanings which are identical to one another or different from one another.

2. A compound as claimed in claim 1, in which D is a group of the formula (2a)

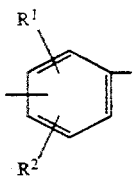

(2a)

in which R¹ denotes hydrogen, methoxy, ethoxy, chlorine, bromine or carboxy and R² is hydrogen, methyl, ethyl, methoxy, ethoxy, chlorine or sulfo.

3. A compound as claimed in claim 1, in which D is a naphthylene unsubstituted or substituted by sulfo.

4. A compound as claimed in claim 1, in which D is a group of the formula (2c)

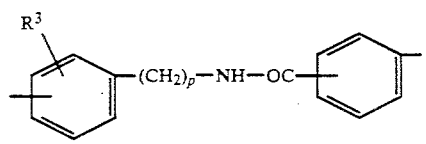

(2c)

in which R³ is hydrogen or sulfo and p represents the number zero, 1 or 2.

5. A compound as claimed in claim 1, in which X is β-sulfatoethyl.

6. A compound as claimed in claim 1, in which Y is β-sulfatoethyl.

7. A compound according to claim 1, wherein m is zero.

8. A compound according to claim 1, where n is zero.

9. A compound as claimed in claim 2, in which X is β-sulfatoethyl.

10. A compound as claimed in claim 3, in which X is β-sulfatoethyl.

11. A compound as claimed in claim 4, in which X is β-sulfatoethyl.

12. A compound as claimed in claim 2, in which Y is β-sulfatoethyl.

13. A compound as claimed in claim 3, in which Y is β-sulfatoethyl.

14. A compound as claimed in claim 4, in which Y is β-sulfatoethyl.

15. A compound as claimed in claim 5, in which Y is β-sulfatoethyl.

16. A compound as claimed in claim 7, in which X is β-sulfatoethyl.

17. A compound as claimed in claim 8, in which X is β-sulfatoethyl.

18. A compound as claimed in claim 7, in which Y is β-sulfatoethyl.

19. A compound as claimed in claim 8, in which Y is β-sulfatoethyl.

* * * * *